United States Patent [19]
Yamada et al.

[11] Patent Number: 5,208,664
[45] Date of Patent: May 4, 1993

[54] IMAGE READING METHOD AND APPARATUS WITH COORDINATION FUNCTION BETWEEN READ VALUE AND ORIGINAL DENSITY

[75] Inventors: Shin Yamada, Kawasaki; Yoshimitsu Kanno, Sagamihara; Teruo Fumoto, Kawasaki, all of Japan

[73] Assignee: Matsushita Electric Industrial Co., Ltd., Osaka, Japan

[21] Appl. No.: 696,412

[22] Filed: May 6, 1991

[30] Foreign Application Priority Data

May 16, 1990 [JP] Japan ................................. 2-127278

[51] Int. Cl.⁵ .............................................. H04N 1/46
[52] U.S. Cl. ................................. 358/80; 358/429; 358/75; 358/455
[58] Field of Search ............. 358/75, 76, 80, 81, 358/429, 443, 448, 452, 455, 461, 463

[56] References Cited

U.S. PATENT DOCUMENTS

| | | | |
|---|---|---|---|
| 4,371,260 | 2/1983 | Yoshimoto et al. | 358/75 |
| 4,656,505 | 4/1987 | Yamada et al. | 358/75 |
| 4,899,216 | 2/1990 | Tatsumi et al. | 358/75 |
| 5,083,217 | 1/1992 | Kumamoto | 358/448 |

FOREIGN PATENT DOCUMENTS 61-274231 12/1986 Japan .

*Primary Examiner*—Edward L. Coles, Sr.
*Assistant Examiner*—Jerome Grant, II
*Attorney, Agent, or Firm*—Lowe, Price, LeBlanc & Becker

[57] ABSTRACT

An image reading system for reading color information on an original picture, the reading system comprising a scanning section for optically scanning the original picture and a color chip having a predetermined density value and a reading section for receiving reflection or transmission light obtained with the scanning section optically scanning the original picture and the color chip and for converting the reflection or transmission light into the corresponding electric signal. The reading system is arranged to optically read a density of the color chip so as to constitute a densitometer with the read density of the color chip being adjusted to be substantially coincident with the predetermined density and to measure densities of highlight and shadow points on the original picture by means of the densitometer. Further, the reading system corrects density values, which are designated by an operator, on the basis of the measured densities so that a balance between a plurality of colors obtained through color separations of the highlight and shadow points is kept and to perform a coordination between the read density and a density of the original picture with the read densities of the highlight and shadow points being adjusted to be coincident with the corrected densities.

5 Claims, 6 Drawing Sheets

HIGHLIGHT POINT

FIG. 7A

IMAGE READING METHOD AND APPARATUS WITH COORDINATION FUNCTION BETWEEN READ VALUE AND ORIGINAL DENSITY

BACKGROUND OF THE INVENTION

The present invention relates generally to an image reading method and apparatus, and more particularly to such an image reading method and apparatus for setting the read signal value, to be outputted when reading a highlight point and shadow point of an original, with the consideration of the density value (or concentration value) of a desirable color chip or the density value of a desirable point on an orignal picture.

Recently, in the electronic plate-making fields to principally contemplate to produce a printed matter, a high-quality image can be obtained in accordance with the computer image processing technique. On the other hand, a reading apparatus for reading a high-quality image can be required for producing the high-quality image. A conventional reading method will be described hereinbelow. In a conventional image reading apparatus, the read image signal and the original density value are coordinated or corresponded with each other by using a plurality of points on a color chip or an original, before reading the original. As the coordinating system, there is a system where the output signal values obtained when reading a color chip having a known density are set to be coordinated with the respective density values of the color chip, thereby heightening the reliability of the read image signal. Further, in order for performing the coordination between the original density value and the read image signal by using a color on the original, there is provided a system where as disclosed in the Japanese Patent Provisional Publication No. 61-274231 the operator designates a plurality of points on an original so that the output signal values obtained when reading these points are set to become operator-desired values by using a color chip.

Generally, color image reading apparatus use signals obtained by separating an original picture into a plurality of colors (for example, R, G and B). Further, in monitors or printers for displaying the image signals, color values of respective signals that have been color separated and are coincident with each other are treated as gray. Accordingly, in order for faithfully reproducing the original picture, the balance of the plural colors color-separated is required to be determined so that the values of the color signals obtained by separating the gray are coincident with each other. There is a problem which arises with the conventional image reading apparatus, however, in that difficulty is encountered to meet the requirement that the operator freely and easily sets the coordination between the read image and the original density value with the plural colors color-separated being balanced with each other. For instance, if using the system where the read signal value of a color chip having a predetermined density value is set so as to coordinated with the density value of the color chip, the coordination between the read image signal and the original density value can be determined with the balance of the plurality of colors color-separated being kept, while the coordination cannot be made freely by the operator.

On the other hand, according a method such as disclosed in the Japanese Patent Provisional Publication No. 61-274231, after the density values of the color components of a plurality of desirable points on an original picture are measured using an ordinal densitometer, the read signal values of the plurality of points are determined with reference to the measured density values so that the coordination between the reading image and the original density value is effected by using a color chip having density values corresponding to the color components representative of the plurality of points. In this case, although the balance of the plurality of colors color-separated can be kept, at least one of the density values corresponding to the color components at the plurality of points is required to be coincident with the density value of the color chip, and hence limitation is imposed upon the selection from the plural points and further the selection is difficult. In addition, since a color chip having a number of density is required to be prepared, searching the target density value becomes troublesome. Moreover, the ordinal is required to be prepared in addition to the image reading apparatus.

SUMMARY OF THE INVENTION

It is therefore an object of the invention to eliminate the above-described problems inherent to the conventional image reading system and to provide an image reading method and apparatus which are capable of freely and easily setting the coordination between the read image signal and the density value of the original so that the balance between a plurality of colors color-separated being kept.

In accordance with the present invention, there is provided an image reading system for reading color information on an original picture, the reading system comprising a scanning section for optically scanning the original picture and a color chip having a predetermined density value and a reading section for receiving reflection or transmission light obtained with the scanning section optically scanning the original picture and the color chip and for converting the reflection or transmission light into the corresponding electric signal. The reading system is arranged to optically read a density of the color chip so as to constitute a densitometer with the read density of the color chip being adjusted to be substantially coincident with the predetermined density and to measure densities of highlight and shadow points on the original picture by means of the densitometer. Further, the reading system corrects density values, which are designated by an operator, on the basis of the measured densities so that a balance between a plurality of colors obtained through color separations of the highlight and shadow points is kept and to perform a coordination between the read density and a density of the original picture with the read densities of the highlight and shadow points being adjusted to be coincident with the corrected densities.

Further, according to this invention, an image reading apparatus is equipped with scanning means for optically scanning the original picture and a color chip having a predetermined density value and reading means for receiving reflection or transmission light obtained with the scanning means optically scanning the original picture and the color chip and for converting the reflection or transmission light into the corresponding electric signal. The control means of the reading system is coupled to the scanning means and the reading means to be arranged to control the operation of the scanning means and the reading means and to be responsive to the electric signal outputted from the reading means. The control means operates the scanning means to optically scan the color chip so as to obtain a read signal so as to compare the value of the read signal with the predetermined density value of the color chip so that the control means controls the reading means in accordance with the comparison result whereby the value of the read signal is adjusted to become equal to the predetermined density value of the color chip. In addition, the control means operates the scanning means to optically scan predetermined highlight and shadow points on the original picture so as to measure density values of the predetermined highlight and shadow points so that density values designated for the highlight and shadow points by an operator are corrected on the basis of the measured density values so as to keep a balance between colors obtained by performing color separation of the highlight and shadow points. Still further, the control means again measures density value of the highlight and shadow points to compare the measured density values with the corrected density values so that the control means controls the reading means in accordance with the comparison result whereby the measured density values become equal to the corrected density values.

BRIEF DESCRIPTION OF THE DRAWINGS

The present invention will be described in further detail with reference to the accompanying drawings, in which.

DETAILED DESCRIPTION OF THE INVENTION

Figure 1:
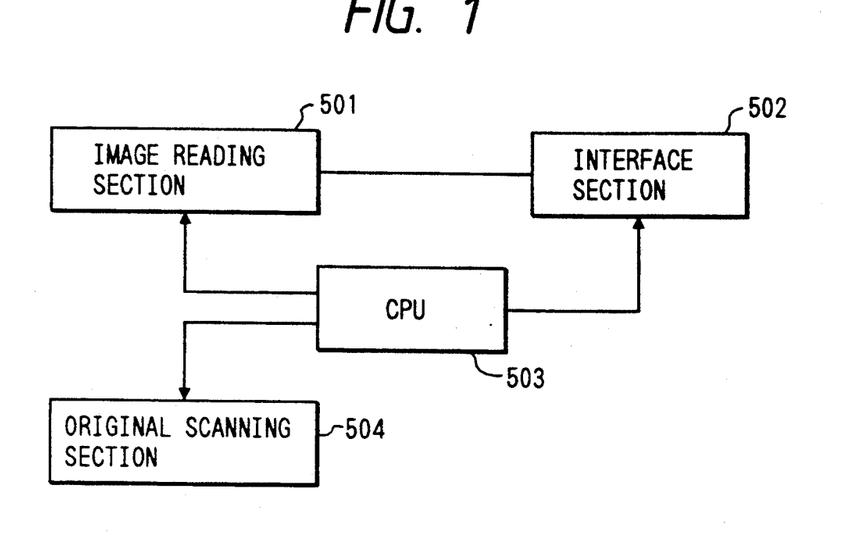
FIG. 1 is a block diagram showing an arrangement of an image reading apparatus useful for describing an embodiment of the present invention.
Figure 2:
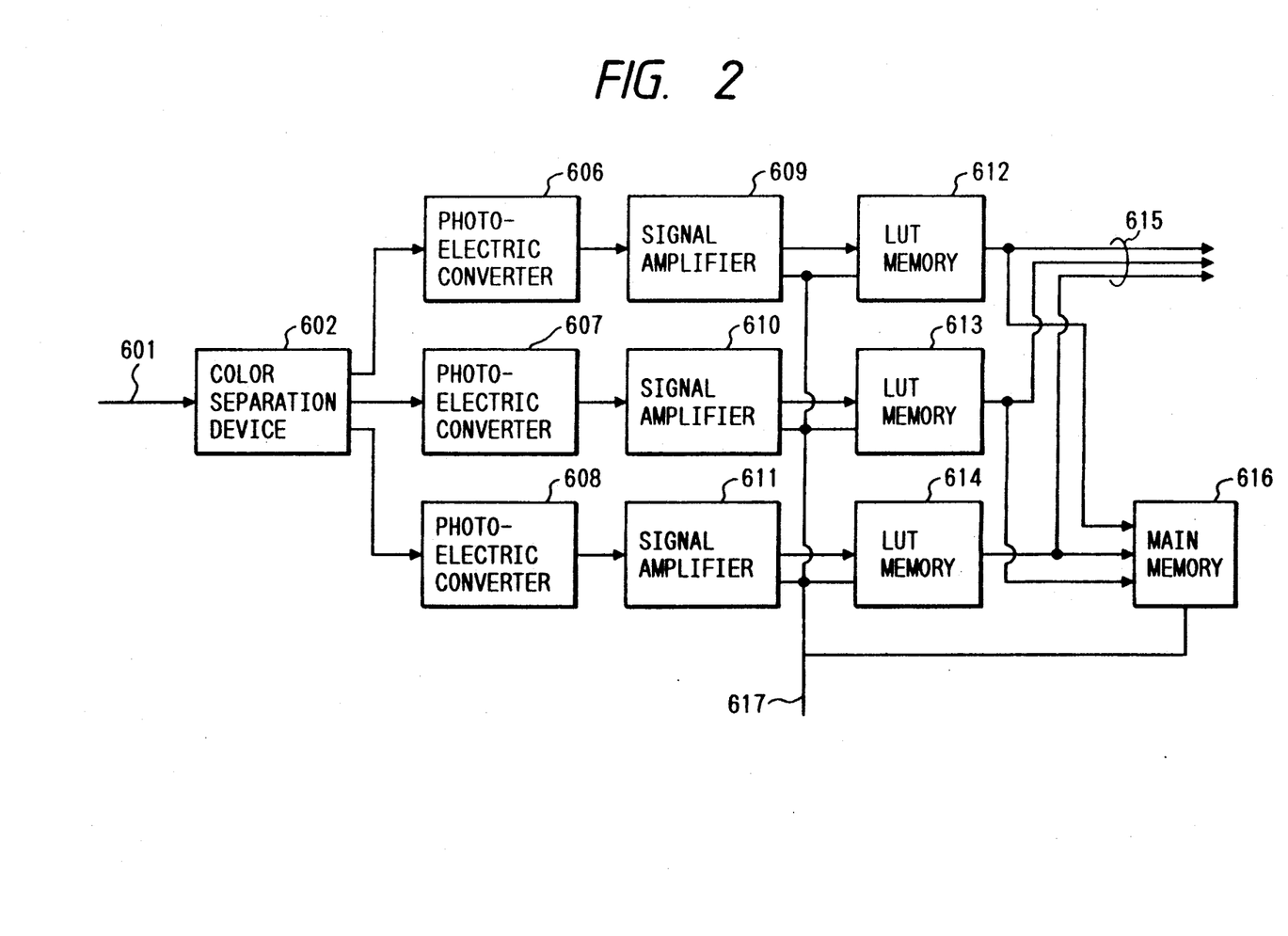
FIG. 2 is a block diagram showing an arrangement of an image reading section of the image reading apparatus illustrated in FIG. 1.

An embodiment of the present invention will be described hereinbelow with reference to the drawings. FIG. 1 is a block diagram showing an arrangement of an image reading apparatus useful for describing an embodiment of this invention, and FIG. 2 shows an arrangement of an image reading section of the image reading apparatus illustrated in FIG. 1. In FIG. 1, the image reading apparatus is composed of an image reading section 501, an original scanning section 504 and an interface section 502 which are respectively controllable in accordance with control signals from a central processing unit (CPU) 503. As illustrated in FIG. 2, the image reading section 501 is responsive to input light 601 through a color separation device 602 for separating the input light 601 so as to produce red light 603, blue light 604 and green light 605. These lights are respectively led to photoelectric converting devices 606, 607 and 608 for the photoelectric conversion of the input lights into electric signals. The electric signals are respectively supplied to lookup table memories 612, 613 and 614 after amplified by means of signal amplifiers 609, 610 and 611. The output signals of the lookup table memories 612 to 614 are respectively applied through signal lines 615 to the interface section 502 as illustrated in FIG. 1. The output signals of the lookup table memories 612 to 614 are also coupled to a main memory 616. Illustrated at numeral 617 is a signal line coupled to the CPU 503 shown in FIG. 1.

Figure 4:
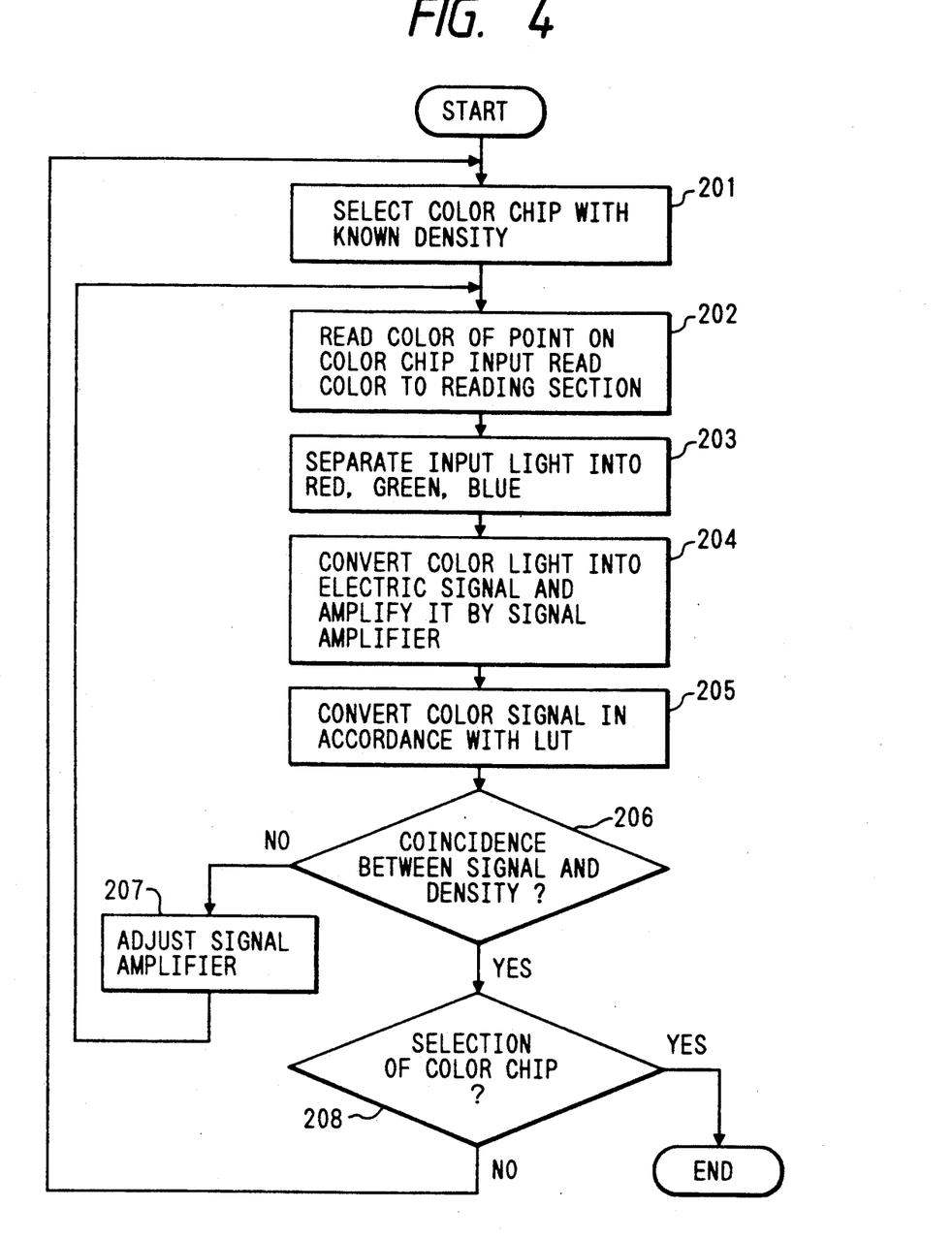
FIG. 4 is a flow chart for describing a constitution of a densitometer.
Figure 5:
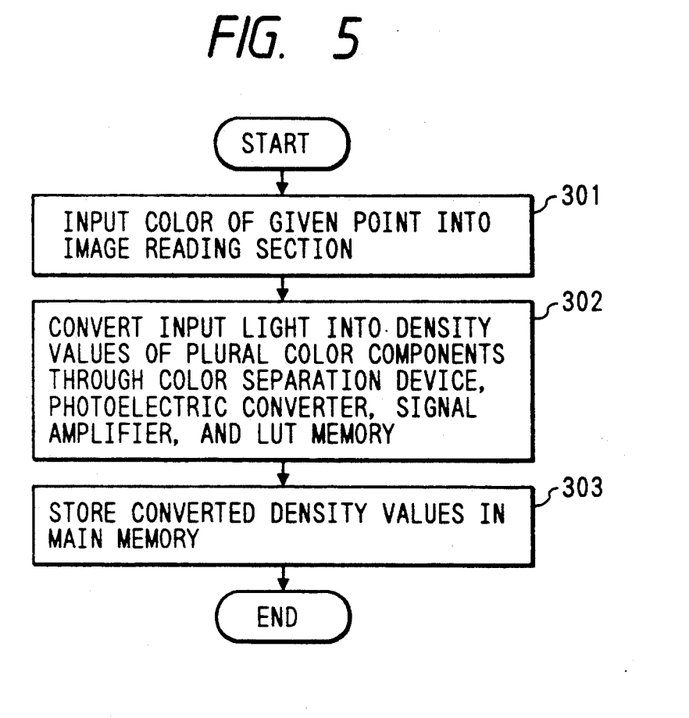
FIG. 5 a flow chart for describing the operation of the densitometer constituted.

The operation of the image reading apparatus will be described hereinbelow with reference to flow charts of FIGS. 3 to 5. The density of a given color is determined on the basis of the balance between three colors color-separated and the density value of one of the three colors. Accordingly, in the case that the balance of the three colors color-separated can be kept, in place of designating the respective density values of the three color components at a highlight point and shadow point on an original picture, the density values of the red component at these points can be designated whereby the coordination between the read signal values and the density values corresponding to these points can be set. Here, this embodiment is made so as to designate the density value of the red component, while it is also appropriate to designate the density value of the blue or green component.

Figure 3:
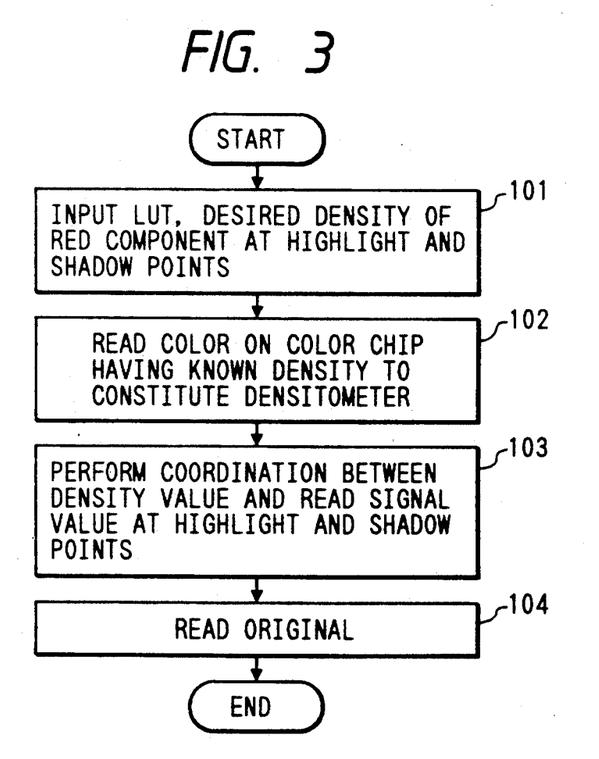
FIG. 3 is a flow chart for describing an operation of the FIG. 1 image reading apparatus and a method of reading an image according to this invention.

In FIG. 3, a step 101 is first executed so that the lookup tables (which will be referred hereinafter to as LUT) and the density values of the red component at a highlight point and shadow point which are desired by the operator are inputted through the interface 502, and the CPU 503 writes the LUTs into the LUT memories 612 to 614 and further writes red-component density values into the main memory 616. Here, the density value of a color chip having a known density is in advance stored as a fixed value into the main memory 616. Secondly, a step 102 is executed in order to read a color of a color chip having a predetermined density, thereby constituting a densitometer. FIG. 4 is a flow chart showing a detailed process to be executed in the step 102 of the flow chart in FIG. 3. In FIG. 4, this process starts with a step 201 so as to select a white or black color chip having a known density, then followed by a step 202 to operate the original scanning section 504 in accordance with the control signal from the CPU 503 to optically scan the color chip to generate reflection or transmission light including the color-chip optical information, which is in turn inputted as the color information of a point on the color chip to the image reading section 501. In a subsequent step 203, this input light is separated into the red light 603, blue light 604 and green light 605 by means of the color separation device 602 and then inputted to the photoelectric converting devices 606, 607 and 608. The following description will be made only in terms of the read light 603. In a step 204, the light 603 color-separated in the color separation device 602 is converted into an electric signal by means of the photoelectric converting device 606 and then amplified by means of the signal amplifier 609, thereafter followed by a step 205 so as to be inputted to the LUT memory 612 so as to convert the color signal into a signal value in accordance with the LUT. Furthermore, in a step 206, the CPU 503 compares the signal value obtained in the LUT memory 612 with the density value of the color chip stored in the main memory 616. If the difference therebetween is relatively great, the process advances to a step 207 in order to change the offset and gain of the signal amplifier 609 through the CPU 503 so that the difference therebetween becomes small. On the other hand, if the difference therebetween with respect the color signal is sufficiently small, the process proceeds to a step 208 in order to check whether the execution of the steps 202 to 207 for the white and black color chips has been completed. If so, the operational flow advances to a step 103 indicated in FIG. 3. On the other hand, if not, the steps 202 to 207 are executed after selecting the remaining color chip. Here, in the case of using the remaining color chip, in the step 207 the adjustment of the offset and gain of the signal amplifier 609 is made so as to keep the relation between the read signal value and the density value in the previous color chip.

Further, a description will be made hereinbelow with reference to FIG. 5 in terms of the operation of the densitometer thus constructed. In FIG. 5, the operation starts with a step 301 in which the CPU 503 operates the original scanning section 504 so that the color of the point to be density-measured is inputted to the image reading section 501 through reflection light or transmission light. In a subsequent step 302, as well as the case of constituting the densitometer, this input light is outputted as the density value of the desired point through the color separation device 602, photoelectric converting devices 606 to 608, signal amplifiers 609 to 611 and LUT memories 612 to 614. Thereafter, in a step 303, the CPU 503 stores the output values in the main memory 616.

Returning back to the flow chart of FIG. 3, after the constitution of the densitometer, the step 103 is executed so as to perform the coordination between the density values and the read signal values on the highlight point and the shadow point. Although in this embodiment the coordination of the shadow point is made after the completion of the coordination at the highlight point, it is appropriate to reverse the order of the coordinations.

Figure 6:
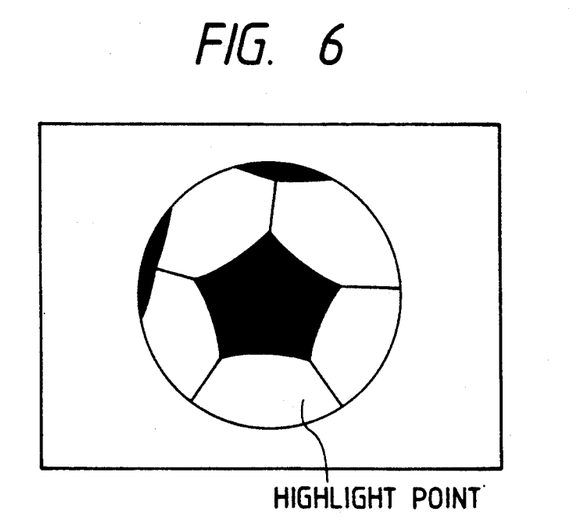
FIG. 6 is an illustration of a highlight point.

The operation for the coordination at the highlight point will be described hereinbelow with reference to FIGS. 7A and 7B in view of FIG. 6 and the following table. FIG. 6 shows ane example of the highlight point and the following table is for showing the variation of the density value to be measured by the densitometer.

TABLE

|  | Red | Blue | Green |
| --- | --- | --- | --- |
| Measured Value due to Densitometer made using color chip | 0.05 | 0.10 | 0.15 |
| Density Value Corrected | 0.01 | 0.02 | 0.03 |
| Measured Value due to Densitometer Adjusted using Highlight Point | 0.01 | 0.02 | 0.03 |

Figure 7A:
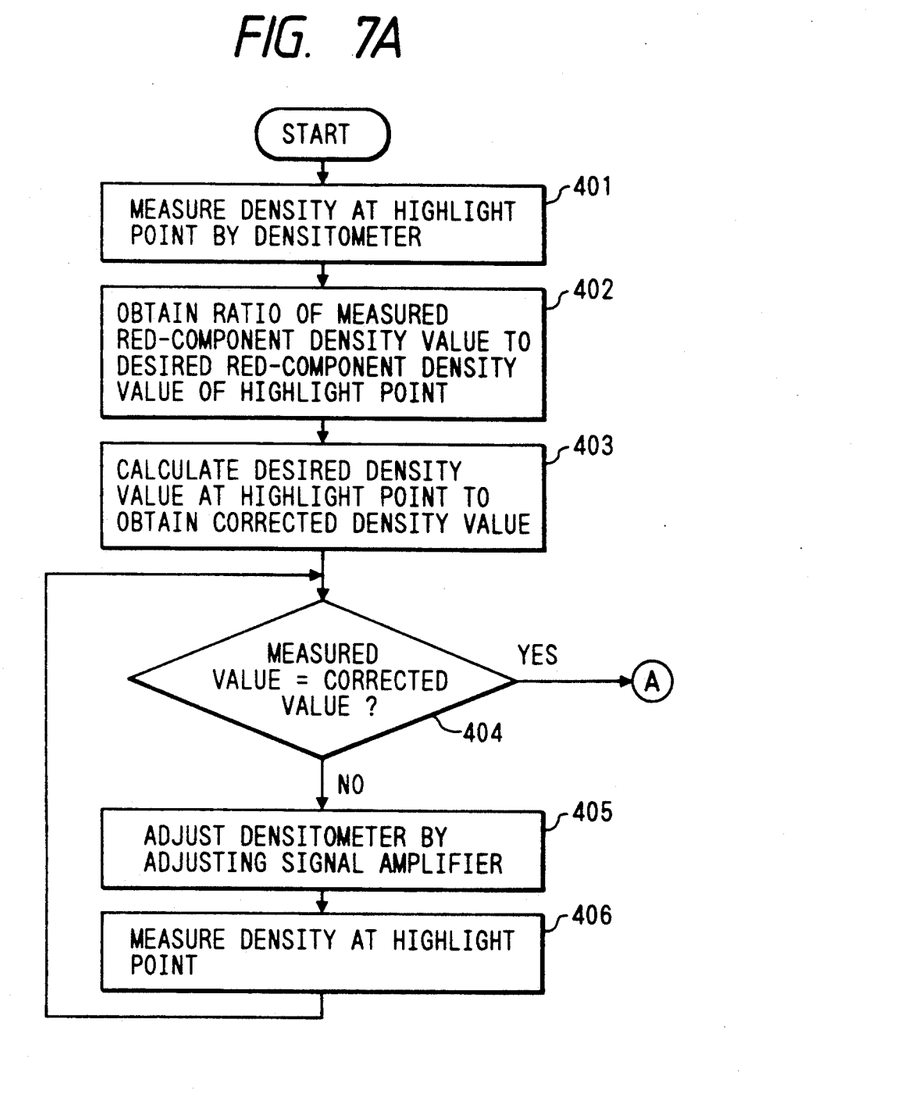
FIGS. 7A and 7B are flow charts for describing a coordination between a density value and a read signal value.
Figure 7B:
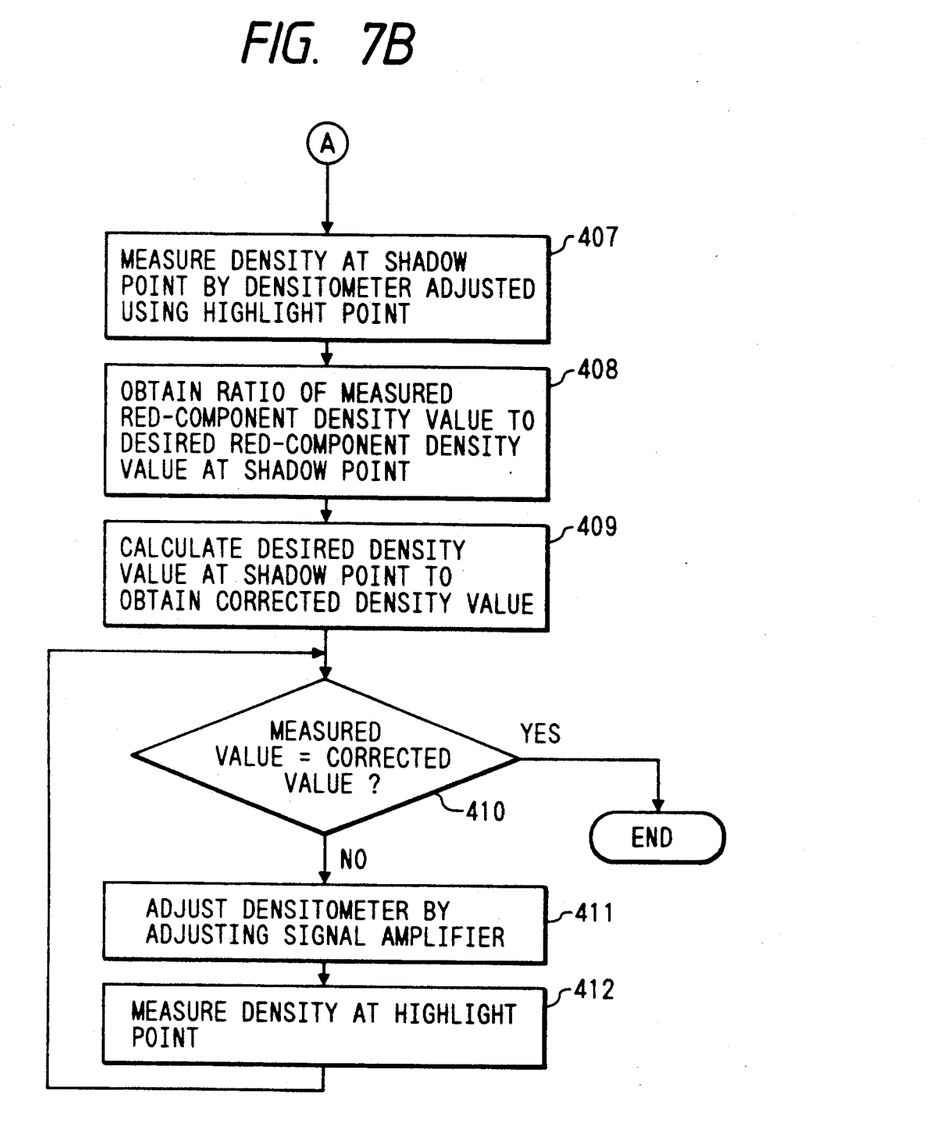

In FIGS. 7A and 7B, a step 401 is first executed so as to measure the density value of the highlight point of the original, designated by the operator, using the densitometer produced by reading the color chip, the measurement result being stored in the main memory 616. Secondly, a step 402 is executed in order to obtain the ratio of this density value of the red component to the desired density value of the red compoment of the highlight point stored in advance in the main memory 616, then followed by a step 403 so as to multiply this ratio by the measured density value of the highlight point to obtain a desired density value of the highlight point which is in turn treated as a corrected density value. For example, assuming that the red-component measured value is taken to be 0.05, the blue-component measured value is taken to be 0.10, the green-component measured value is taken as 0.15 and the the desired value of the red component is 0.01, if obtaining the ratio therebetween using the CPU 503, the ratio becomes 1/5, and hence the red-component corrected density value becomes 0.01, the blue-component corrected density value reaches 0.02 and the green-component corrected density value results in being 0.03.

Thereafter, a step 404 follows so as to compare the corrected density value with the density value measured by the CPU 503. If the measured density value and the corrected density value are not coincident with each other, a step 405 follows to adjust the offset and gain of each of the signal amplifiers 609 to 611 so as to adjust the densitometer, then followed by a step 406 so as to again measure the density value of the highlight point, thereafter returning to the above-mentioned state 404. Here, the coincidence between the measured density value and the corrected density value can be made when, after the densitometer adjustment, the red-component measured value of the highlight point is 0.01, the blue-component measured value is 0.02 and the green-component measured value is 0.03.

The measured value to be outputted from the densitometer after the adjustment is a value obtained by multiply a constant by the actual density and the ratio of the red-component measured value, the blue-component measured value and the green-component measured value reflects the balance between the colors at the measured point. Thus, a step 407 is executed in order to measure the density value of the shadow point by means of the adjusted densitometer and thereafter a step 408 follows to obtain a ratio of the red-component density value to the the desired density value of the red component of the shadow point previously inputted in the main memory 616. The step 408 is followed by a step 409 to multiply this ratio by the measured density value of the shadow point so as to obtain a desired density value of the shadow point which is in turn treated as the corrected density value. This corrected density value includes a red-component density value and is a value which allows keeping the color balance. In addition, in a step 410, the density value measured by the CPU 503 is compared with the corrected density value. If they are different from each other, the operation advances to a step 411 in order to adjust the densitometer by adjusting the offset and gain of each of the signal amplifiers 609 to 611 with the relation between the read signal value and the density value at the highlight point being kept as it is. The step 411 is followed by a step 412 to again measure the density value of the shadow point. Thereafter, the operational flow returns to the above-mentioned step 410. If the answer in the step 410 is affirmative, the measured density value becomes equal to the read signal value, thereby completing the coordination between the read signal value and the original density value and then terminating the operation of the step 103. After the termination of the step 103, a step 104 follows in order to read the image. Here, although in this embodiment the input of the desired density values of the red components at the highlight point and the shadow point is effected prior to the constitution of the densitometer due to the color chip, it is also appropriate to perform the input thereof after the step 102.

According to this embodiment, the densitometer is constituted so that the balance of three colors color-separated being kept, and after the positions and red-component density values of the highlight point and shadow point determined by the operator are inputted, the coordination between the read signal value and the density value at the two point is made using the densitometer and the CPU. Thus, the operator can freely and easily set the coordination between the read signal value and the original density value so that the balance of the three colors color-separated being kept. For instance, in FIG. 6, the white of a soccer ball can be set as the white of the read image in place of the white of the color chip to thereby prevent the entire image from turning red.

Further, according to this embodiment, the density values of the highlight point and shadow point designated by the operator are measured with a densitometer constituted using a color chip, and the density values designated by the operator are corrected using the measured density values so that the balance of a plurality of colors color-separated is kept so that the read signal values of the two points are adjusted so as to be the corrected density values. Thus, it is possible to freely and easily perform the coordination between the read image signal and the original density value so that a plurality of colors color-separated being balanced.

It should be understood that the foregoing relates to only a preferred embodiment of the present invention, and that it is intended to cover all changes and modifications of the embodiment of the invention herein used for the purposes of the disclosure, which do not constitute departures from the spirit and scope of the invention.

What is claimed is:

1. An image reading method of reading color information on an original picture, comprising the steps of:
   optically reading a density of a color chip having a predetermined density so as to constitute a densitometer with the read density of said color chip being adjusted to be substantially coincident with the predetermined density, said densitometer being arranged so as to measure a density a point on said original picture;
   measuring densities of highlight and shadow points on said original picture, which are designated by an operator, by means of said densitometer;
   correcting density values, which are designated by said operator, on the basis of the measured densities so that a balance between a plurality of colors obtained through color separations of the highlight and shadow points is kept and so that values of color signals obtained when color-separating gray are coincident with each other; and
   performing a coordination between the read density and a density of said original picture with the read densities of the highlight and shadow points being adjusted to be coincident with the corrected densities, thereby determining an output signal when reading a point on said original picture.

2. An image reading method of reading color information on an original picture using an image reading section for converting a given color into an electric signal, an interface section for inputting and outputting a signal from and to an external computer, a color chip having a known density, a scanning section for optically scanning said original picture and a processing section for controlling said scanning section, said interface section and said image reading section and further for performing various calculations, said image reading method comprising the steps of: adjusting said image reading section so that a read signal value of said color chip corresponds to the density of said color chip so as to constitute a densitometer; measuring density values of highlight and shadow points, designated by an operator, by means of said densitometer; correcting density values, designated by said operator, on the basis of the measured density values by means of said processing section so that a plurality of colors obtained by color-separating said highlight and shadow points are balanced; and performing a coordination between a read image signal and a density value of said original picture by adjusting said image reading section so that read signal values of said highlight and shadow points become equal to the corrected density values.

3. An image reading apparatus for reading color information from an original picture, comprising:
   scanning means for optically scanning said original picture and a color chip having a predetermined density value;
   reading means for receiving reflection or transmission light obtained with said scanning means optically scanning said original picture and said color chip and for converting the reflection or transmission light into the corresponding electric signal; and
   control means coupled to said scanning means and said reading means to be arranged to control the operation of said scanning means and said reading means and to be responsive to the electric signal outputted from said reading means, said control means operating said scanning means to optically scan said color chip so as to obtain a read signal so as to compare the value of said read signal with the predetermined density value of said color chip so that said control means controls said reading means in accordance with the comparison result whereby the value of said read signal is adjusted to become equal to the predetermined density value of said color chip, and further said control means operates said scanning means to optically scan predetermined highlight and shadow points on said original picture so as to measure density values of said predetermined highlight and shadow points so that density values designated for said highlight and shadow points by an operator are corrected on the basis of the measured density values so as to keep a balance between colors obtained by performing color separation of said highlight and shadow points, and still further said control means again measures density value of said highlight and shadow points to compare the measured density values with the corrected density values so that said control means controls said reading means in accordance with the comparison result whereby the measured density values become equal to said corrected density values.

4. An image reading system as claimed in claim 3, wherein said control means calculates the ratios of the designated density values to the measured density values at the highlight and shadow points so as to correct the designated density values on the basis of the calculated ratio.

5. An image reading system as claimed in claim 3, wherein said reading means includes signal amplifying means for amplifying the converted electric signal, and said control means adjusts the offset and gain of said signal amplifying means whereby the value of said read signal is adjusted to become equal to the predetermined density value of said color chip.

* * * * *